United States Patent
Zhou et al.

(10) Patent No.: US 7,536,382 B2
(45) Date of Patent: May 19, 2009

(54) QUERY REWRITING WITH ENTITY DETECTION

(75) Inventors: Hong Zhou, Sunnyvale, CA (US);
Krishna Bharat, San Jose, CA (US);
Michael Schmitt, Newfalm (DE);
Michael Curtiss, Sunnyvale, CA (US);
Marissa Mayer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 327 days.

(21) Appl. No.: 10/813,572

(22) Filed: Mar. 31, 2004

(65) Prior Publication Data

US 2005/0222977 A1    Oct. 6, 2005

(51) Int. Cl.
G06F 17/30 (2006.01)
(52) U.S. Cl. .............................. 707/4; 707/5; 707/104.1; 715/206
(58) Field of Classification Search .................. 715/206
See application file for complete search history.

(56) References Cited

U.S. PATENT DOCUMENTS

| | | | | |
|---|---|---|---|---|
| 5,555,408 A | * | 9/1996 | Fujisawa et al. | 707/5 |
| 5,640,553 A | * | 6/1997 | Schultz | 707/5 |
| 5,675,819 A | * | 10/1997 | Schuetze | 704/10 |
| 5,765,147 A | * | 6/1998 | Mattos et al. | 707/4 |
| 5,771,378 A | | 6/1998 | Holt et al. | 395/605 |
| 5,797,136 A | * | 8/1998 | Boyer et al. | 707/2 |
| 6,006,225 A | * | 12/1999 | Bowman et al. | 707/5 |
| 6,134,540 A | * | 10/2000 | Carey et al. | 707/2 |
| 6,151,624 A | | 11/2000 | Teare et al. | |

(Continued)

FOREIGN PATENT DOCUMENTS

DE       101 34 128 A1    9/2002

(Continued)

OTHER PUBLICATIONS

Paul Thompson and Christopher C. Dozier, "Name Searching and Information Retrieval", "Proceedings of the Second Conference on Empirical Methods in Natural Language Processing", "Association for Computational Linguistics", Somerset, New Jersey, 134-140, 1997.*

(Continued)

*Primary Examiner*—Pierre M Vital
*Assistant Examiner*—Christopher P Nofal
(74) *Attorney, Agent, or Firm*—Harrity & Harrity, LLP (57) ABSTRACT

A system receives a search query, determines whether the received search query includes an entity name, and determines whether the entity name is associated with a common word or phrase. When the entity name is associated with a common word or phrase, the system generates a link to a rewritten query, performs a search based on the received search query to obtain first search results, and provides the first search results and the link to the rewritten query. When the entity name is not associated with a common word or phrase, the system rewrites the received search query to include a restrict identifier associated with the entity name, generates a link to the received search query, performs a search based on the rewritten search query to obtain second search results, and provides the second search results and the link to the received search query.

18 Claims, 11 Drawing Sheets

U.S. PATENT DOCUMENTS

| | | | |
|---|---|---|---|
| 6,185,558 B1 | 2/2001 | Bowman et al. ................ 707/5 |
| 6,230,158 B1* | 5/2001 | Burrows ................... 707/102 |
| 6,397,211 B1* | 5/2002 | Cooper ........................ 707/3 |
| 6,411,950 B1* | 6/2002 | Moricz et al. ................ 707/3 |
| 6,418,434 B1* | 7/2002 | Johnson et al. ............... 707/5 |
| 6,424,980 B1* | 7/2002 | Iizuka et al. ............... 715/206 |
| 6,460,029 B1 | 10/2002 | Fries et al. |
| 6,564,210 B1 | 5/2003 | Korda et al. |
| 6,564,213 B1* | 5/2003 | Ortega et al. .................. 707/5 |
| 6,578,022 B1* | 6/2003 | Foulger et al. .............. 706/45 |
| 6,615,209 B1* | 9/2003 | Gomes et al. .................. 707/5 |
| 6,671,681 B1* | 12/2003 | Emens et al. .................. 707/5 |
| 6,735,585 B1* | 5/2004 | Black et al. ................... 707/3 |
| 6,772,150 B1* | 8/2004 | Whitman et al. .............. 707/6 |
| 6,931,401 B2* | 8/2005 | Gibson et al. ................. 707/6 |
| 7,165,063 B2* | 1/2007 | Beyer et al. ................... 707/3 |
| 7,333,976 B1* | 2/2008 | Auerbach et al. ............. 707/3 |
| 7,379,933 B1* | 5/2008 | Witkowski et al. ............ 707/4 |
| 7,409,383 B1* | 8/2008 | Tong et al. .................... 707/3 |
| 2001/0037329 A1* | 11/2001 | Huffman et al. ............... 707/5 |
| 2002/0002552 A1* | 1/2002 | Schultz et al. ................. 707/3 |
| 2002/0099720 A1* | 7/2002 | Bansal ................... 707/104.1 |
| 2002/0111945 A1* | 8/2002 | Young et al. .................. 707/9 |
| 2002/0120712 A1 | 8/2002 | Maislin ..................... 709/217 |
| 2002/0129026 A1* | 9/2002 | Reardon ..................... 707/10 |
| 2002/0161752 A1* | 10/2002 | Hutchison ..................... 707/3 |
| 2002/0169595 A1* | 11/2002 | Agichtein et al. ............. 704/9 |
| 2003/0033279 A1* | 2/2003 | Gibson et al. ................. 707/1 |
| 2003/0033324 A1* | 2/2003 | Golding ..................... 707/200 |
| 2003/0046311 A1* | 3/2003 | Baidya et al. ............... 707/200 |
| 2003/0055831 A1 | 3/2003 | Ryan et al. ................. 707/100 |
| 2003/0088547 A1* | 5/2003 | Hammond ..................... 707/3 |
| 2003/0233224 A1* | 12/2003 | Marchisio et al. ............. 704/4 |
| 2004/0225681 A1* | 11/2004 | Chaney et al. .......... 707/104.1 |
| 2004/0236736 A1* | 11/2004 | Whitman et al. ............... 707/3 |
| 2005/0033711 A1* | 2/2005 | Horvitz et al. ............... 706/50 |
| 2005/0149507 A1* | 7/2005 | Nye .............................. 707/3 |
| 2005/0222975 A1* | 10/2005 | Nayak et al. ................... 707/3 |
| 2005/0222976 A1* | 10/2005 | Pfleger ......................... 707/3 |

FOREIGN PATENT DOCUMENTS

EP    1 160 686 A2    12/2001

OTHER PUBLICATIONS

Eduard Hovy et al. "The Use of External Knowledge in Factod QA" Proceedings of the TREC-10 Conference, Nov. 2001, 9 pages.*

Shumeet Baluja et al. "Applying Machine Learning for High Performance Named-Entity Extraction" Pacific Association for Computational Linguistics 1999 14 pages.*

Calishain et al, "Google Hacks" O'Reilly Feb. 2003 pp. 6, 42, and 53-54.*

J. Jargon, May 27, 2008, Gasp Python Course, pp. 1-5.*

Claims of U.S. Appl. No. 10/813,359 filed Mar. 31, 2004 titled "Query Rewriting With Entity Detection," 15 pages.

International Search Report for corresponding PCT application with a mailing date of; Jun. 28, 2005; 3 pages.

"Google News Loses Functionality" Search Engine Showdown, Mar. 25, 2003, http://www.searchenginesearchshowdown.com/blog/2003/03/google_news_loses_functionalit.shtml, 1 pg.

"Northern Light Power Search" as archived Feb. 7, 2003, http://web.archive.org/web/20030207051509/www.northernlight.com/power.html, 1. pg.

Office Action dated Feb. 25, 2008, issued in U.S. Appl. No. 10/813,359.

"Northern Light Business Search" as archived Feb. 5, 2003, http://web.archive.org/web/20030205105021/www.northernlight.com/business.html, 1 pg.

* cited by examiner

Google™ News BETA

[ george bush source:msnbc ]  [ SEARCH NEWS ]

SEARCHED NEWS SOURCE MSNBC FOR GEORGE BUSH

SEARCH NEWS PAGES THAT CONTAIN THE TERM(S) GEORGE + BUSH + MSNBC ⎯⎯ 850

GEORGE BUSH: NATION-BUILDER? ⎯⎯ 810
MSNBC - MARCH 4, 2004
Critics of the Bush administration's foreign policy, particularly members of the Congressional Black Caucus, decry Aristide's departure as another case of . . . .

POLITICS, AS USUAL AT SOUTH BY SOUTHWEST FESTIVAL ⎯⎯ 820
MSNBC - MARCH 11, 2004
. . . Austin and Texas -- it's such a weird political state, with all the redistricting going on and all that stuff, and the fact that George Bush was the . . . .

BUSH FOCUSING ON JOBS IN OHIO TRIP ⎯⎯ 830
MSNBC - MARCH 10, 2004
. . . Kerry criticized Bush's economic policies Wednesday, telling an AFL-CIO meeting that "George Bush will fight like hell to keep his own job, but he won't . . . .

QUERY REWRITING WITH ENTITY DETECTION

BACKGROUND OF THE INVENTION

1. Field of the Invention

Systems and methods consistent with the principles of the invention relate generally to information retrieval and, more particularly, to rewriting of search queries based on detection of the names of certain entities in the queries.

2. Description of Related Art

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on search terms (called a search query) provided by the user. The goal of a search engine is to identify links to relevant results based on the search query. Typically, the search engine accomplishes this by matching the terms in the search query to a corpus of pre-stored web documents. Web documents that contain the user's search terms are considered "hits" and are returned to the user.

Some search engines permit a user to restrict a search to a set of related documents, such as documents associated with the same web site, by including special characters or terms in the search query. Oftentimes, however, users forget to include these special characters/terms or do not know about them.

SUMMARY OF THE INVENTION

According to one aspect consistent with the principles of the invention, a method may include receiving a search query, determining whether the received search query includes an entity name, and determining whether the entity name is associated with a common word or phrase. The method may also include selectively rewriting the received search query based on whether the entity name is determined to be associated with a common word or phrase, performing a search based on the received search query or the rewritten search query to obtain search results, and presenting the search results.

According to another aspect, a system may include means for receiving a search query, means for determining whether the received search query includes an entity name, and means for determining whether the entity name is associated with a common word or phrase. The system may also include means for rewriting the received search query when it is determined that the entity name is associated with a common word or phrase, means for performing a search based on the rewritten search query to obtain search results, and means for providing the search results.

According to yet another aspect, a system includes a memory and a processor connected to the memory to receive a search query, determine whether the received search query includes an entity name, and selectively rewrite the received search query to obtain a rewritten search query when it is determined that the received search query includes an entity name.

According to a further aspect, a method may include determining a set of entity names, determining whether each of the entity names is associated with a common word or phrase, and generating a table of the entity names that are associated with common words or phrases.

According to another aspect, a method may include receiving a search query, determining whether the received search query includes an entity name, and determining whether the entity name is associated with a common word or phrase. When the entity name is associated with a common word or phrase, the method may include generating a link to a rewritten query, performing a search based on the received search query to obtain first search results, and providing the first search results and the link to the rewritten query. When the entity name is not associated with a common word or phrase, the method may include rewriting the received search query to include a restrict identifier associated with the entity name, generating a link to the received search query, performing a search based on the rewritten search query to obtain second search results, and providing the second search results and the link to the received search query.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Systems and methods consistent with the principles of the invention may rewrite search queries or generate suggestion links to rewritten search queries upon detection of the names of certain entities. An "entity," as used herein, may refer to anything that can be tagged as being associated with certain documents. Examples of entities may include news sources, stores, such as online stores, product categories, brands or manufacturers, specific product models, condition (e.g., new, used, refurbished, etc.), authors, artists, people, places, and organizations.

Some entity names are unambiguous and uniquely identify particular entities. A large number of names, however, are somewhat ambiguous or generic, making it more difficult to identify the entities to which they are intended to correspond when included in users' search queries. Systems and methods consistent with the principles of the invention provide mechanisms for determining the entities to which entity names correspond and selectively rewriting users' search queries based on the entity names. Accordingly, a user's search query may be restricted to a search of document(s) associated with the entity that the user intended in the search.

Exemplary Network Configuration

Figure 1:
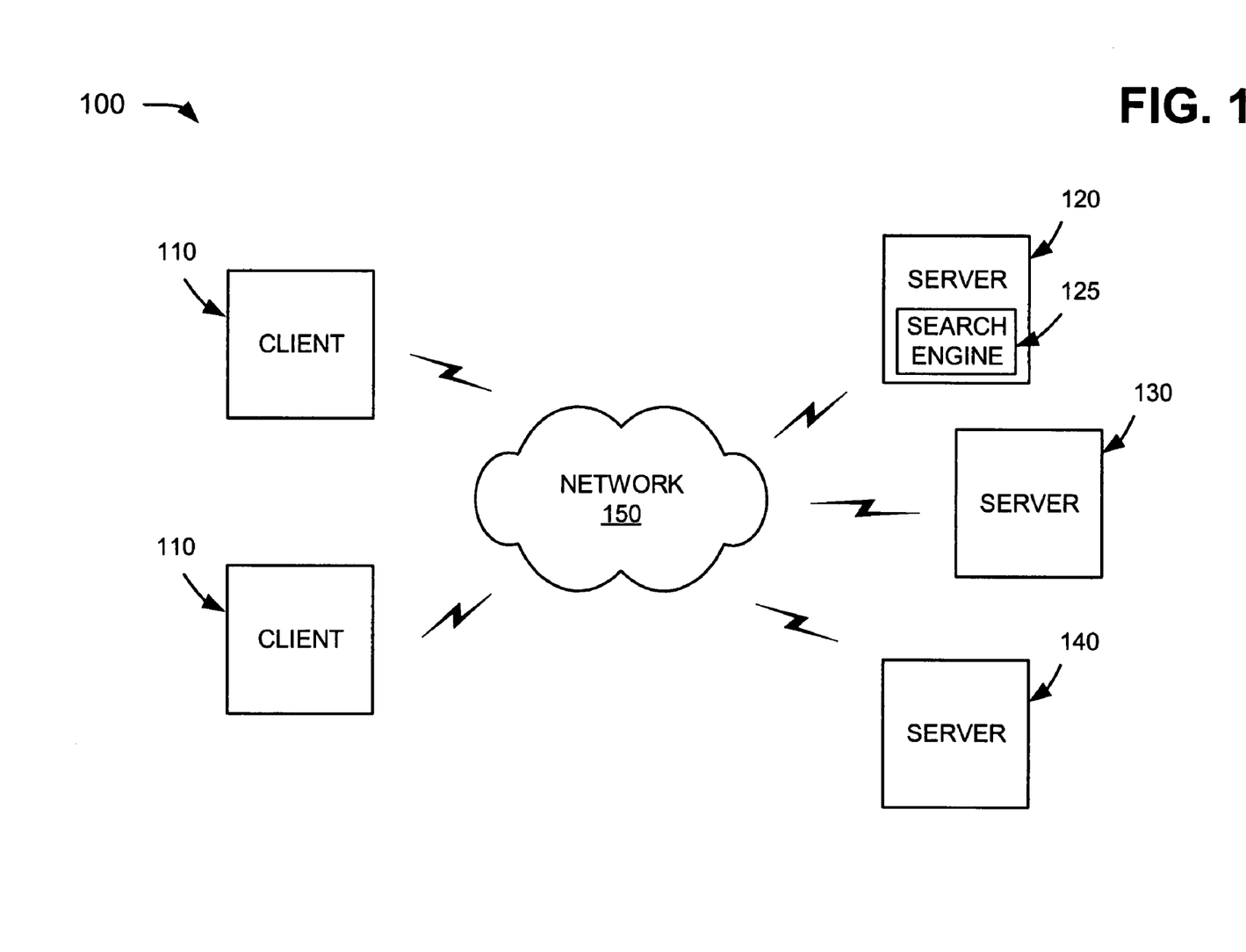
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client components. A component may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server components that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may crawl a corpus of documents (e.g., web pages), index the documents, and store information associated with the documents in a repository of crawled documents. Servers 130 and 140 may store or maintain documents that may be crawled by server 120. While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to or from a document.

Exemplary Client/Server Architecture

Figure 2:
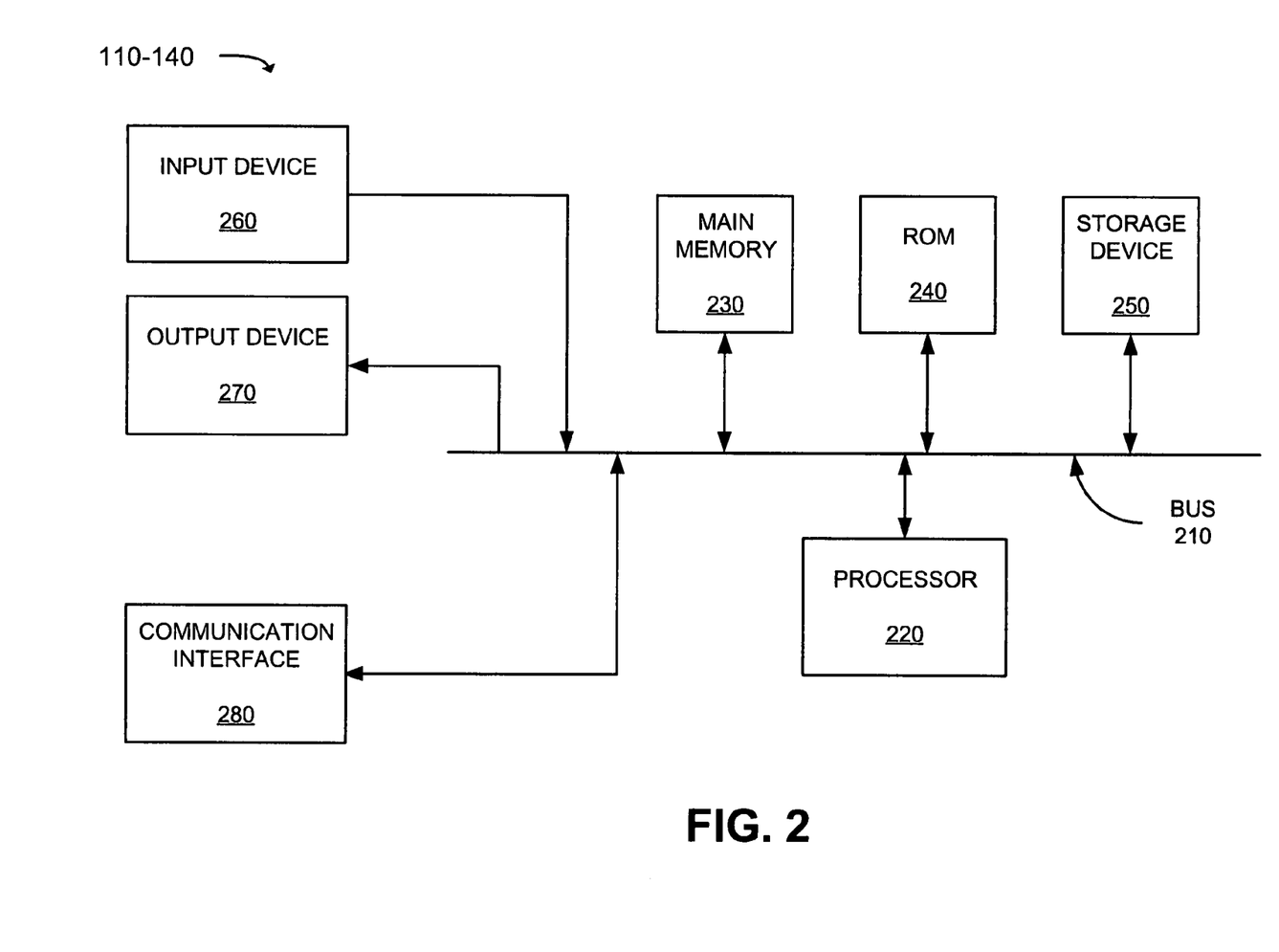
FIG. 2 is an exemplary diagram of a client and/or server of FIG. 1 according to an implementation consistent with the principles of the invention.

FIG. 2 is an exemplary diagram of a client or server component (hereinafter called "client/server component"), which may correspond to one or more of clients 110 and servers 120-140, according to an implementation consistent with the principles of the invention. The client/server component may include a bus 210, a processor 220, a main memory 230, a read only memory (ROM) 240, a storage device 250, an input device 260, an output device 270, and a communication interface 280. Bus 210 may include a path that permits communication among the elements of the client/server component.

Processor 220 may include a conventional processor or microprocessor, or another type of processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to the client/server component, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server component to communicate with other devices and/or systems. For example, communication interface 280 may include mechanisms for communicating with another device or system via a network, such as network 150.

As will be described in detail below, the client/server component, consistent with the principles of the invention, may perform certain searching-related operations. The client/server component may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Server

Figure 3:
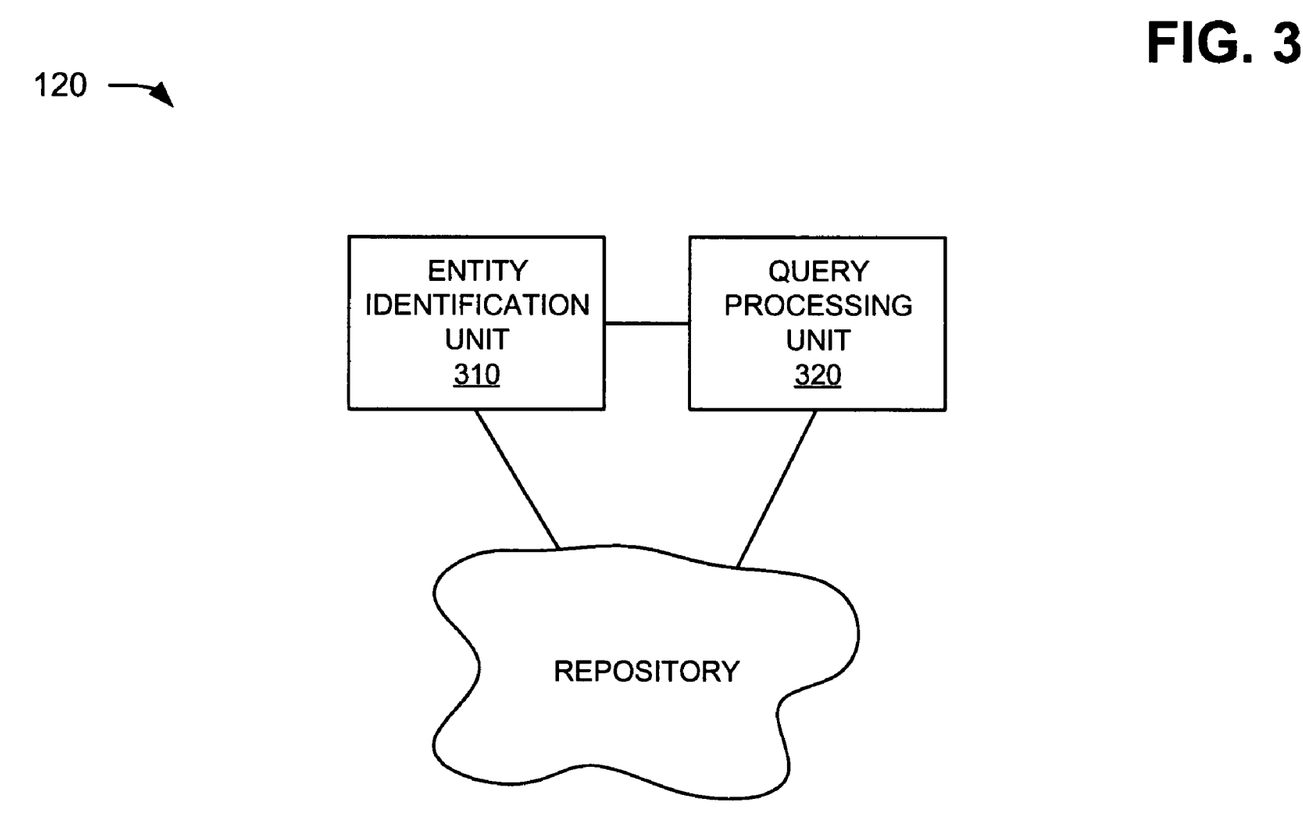
FIG. 3 is an exemplary functional block diagram of a portion of a server of FIG. 1 according to an implementation consistent with the principles of the invention.

FIG. 3 is an exemplary functional block diagram of a portion of server 120 according to an implementation consistent with the principles of the invention. According to one implementation, one or more of the functions described below may be performed by search engine 125. According to another implementation, one or more of these functions may be performed by a component external to server 120, such as a computer associated with server 120 or one of servers 130 and 140.

Server 120 may include an entity identification unit 310 and a query processing unit 320 connected to a repository. The repository may include information associated with documents that were previously crawled and stored, for example, by server 120.

Entity identification unit 310 may generate a list of entity names. Entity identification unit 310 may obtain an initial set of entity names for entities in a particular context (e.g., names of news sources in the news source context or store names in the store context). There are many ways that entity identification unit 310 can obtain the initial set of entity names in a particular context. For example, entity identification unit 310 may obtain entity names from online directories, lists, group postings, by analyzing a corpus of documents, etc.

For each of these names, entity identification unit 310 may also identify an entity identifier, such as a homepage domain name or a category identifier, associated with the name. For example, if the name was Washington Post, then the associated entity identifier might be washingtonpost.com. Entity identification unit 310 may identify the associated entity identifier from, for example, an analysis of the document information in the repository.

Entity identification unit 310 may then process the entity names to produce a list of variations of the names. Entity identification unit 310 may apply several transformations to the name and/or its entity identifier, such as: using the entity name as is; using the entity identifier as is; removing modifiers, such as "a," "the," "inc," "inc.," "co," and "co.," from the entity name; replacing spaces with hyphens or underscores, or vice versa, within the entity name; removing apostrophes from the entity name; interchanging "and" and "&" in the entity name and/or the entity identifier; removing "and" and "&" from the entity name and/or the entity identifier; removing the initial "www." and/or the trailing ".com" from the entity identifier; and/or treating periods in the entity identifier with no spaces on either side of them as spaces or deleting the periods. Other or different transformations may also be used.

Figure 4:
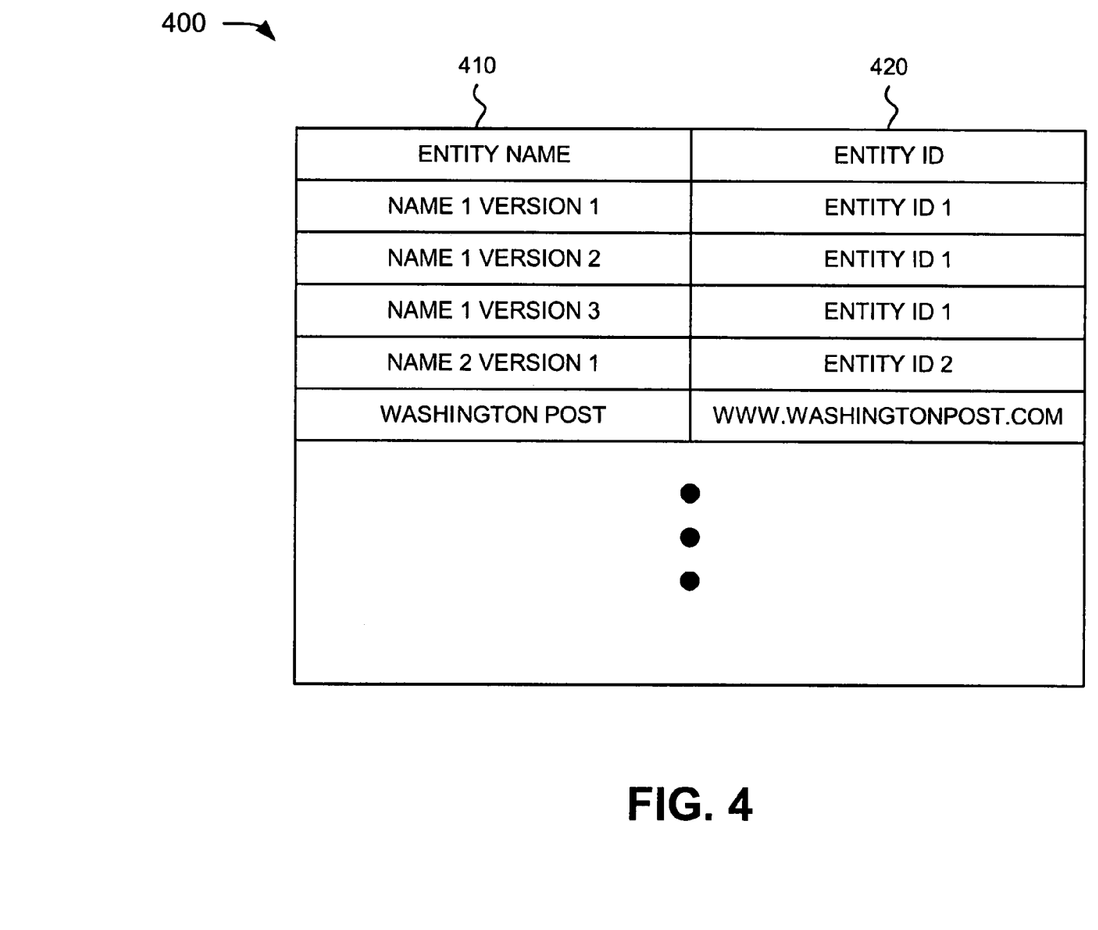
FIG. 4 is an exemplary diagram of a list of candidate strings according to an implementation consistent with the principles of the invention.

Entity identification unit 310 may form these name variations into a list of candidate strings. FIG. 4 is an exemplary diagram of a list of candidate strings 400 according to an implementation consistent with the principles of the invention. Candidate string list 400 might include a number of entries (candidate strings) associated with the various versions of entity names and their associated entity identifiers. An entry in list 400 might include an entity name field 410 and an entity ID field 420. Entity name field 410 may include a variation of an entity name or its associated entity identifier. Entity ID field 420 may include information that uniquely identifies the entity corresponding to the entity name in entity name field 410, such as a domain, a URL, or a category identifier. An example of an entry for the news source Washington Post might include "washington post" in entity name field 410 and "www.washingtonpost.com" in entity ID field 420.

Returning to FIG. 3, query processing unit 320 may process the list of candidate strings to determine whether a search query should be automatically rewritten or whether rewriting of a query should be suggested. For example, query processing unit 320 may determine whether a query includes an entity name or any variation thereof. Query processing unit 320 may check the terms of the query against list of candidate strings 400 (FIG. 4). In one implementation, query processing unit 320 may check whether a word, or phrase (hereinafter "term" will be used to encompass both a "word" and a "phrase"), at the left or right most position of the query matches one of the candidate strings. In another implementation, query processing unit 320 may check whether any term in the query matches one of the candidate strings.

If a term matches one of the candidate strings, query processing unit 320 may optionally determine whether a word in the query that neighbors the term indicates that no further processing of the query should occur. For example, query processing unit 320 may determine whether a word that neighbors the term (e.g., is adjacent to or near the term) forms a common phrase with the term, such that the combination of this word with the term forms a phrase that should not be decomposed.

To illustrate this, assume that the query includes the words "time travel" and the term "time" has been identified as an entity name. The user who provided the query may have meant two things. First, the user may want to find information on the phrase "time travel." Alternatively, the user may want to find information on "travel" from the news source "Time." In this case, query processing unit 320 may recognize the phrase "time travel" as a common phrase and determine that the phrase should not be decomposed.

Query processing unit 320 may identify common phrases from an exhaustive list of phrases. The list of phrases may be obtained from a number of sources. One such source may include the repository of documents. For example, documents in the repository may be analyzed to identify phrases that appear more than a threshold number of times in different documents.

When query processing unit 320 determines that no further processing of the query should occur, then query processor 320 may perform a search using the original query and present the search results to the user. In this case, query processing unit 320 may optionally include a link to a rewritten query with the search results. The rewritten query may restrict the search to the entity identifier (e.g., domain) associated with the entity name (or variation) in the query.

When query processing unit 320 determines that further processing of the query should occur, then query processing unit 320 may determine whether the term is associated with a common word or phrase. There are several ways that query processing unit 320 may determine whether the term is associated with a common word or phrase. For example, query processing unit 320 may compare the term to a dictionary of English words and phrases. Alternatively, query processing unit 320 may use an inverse document frequency (IDF) weighting technique or a conventional linguistic modeling technique. One such technique may involve analyzing a corpus of documents and creating a hash table based on the terms in the documents. For example, each term in a document may be identified and hashed. The count value in the corresponding entry in the hash table may then be incremented. Once the corpus has been analyzed, the count values may reflect which terms occurred more often and which terms occurred less often. Query processing unit 320 may identify terms that have occurred more than a threshold amount as common terms.

If query processing unit 320 determines that the query term is not associated with a common word or phrase, then query processing unit 320 may rewrite the query. The rewritten query may be based on the identification of an entity name and restrict the query to a search associated with the entity name. For example, if a user query includes "washingtonpost," then the query may be rewritten to "source:washingtonpost" to indicate that the search is to be restricted to the entity identifier (domain) associated with the news source Washington Post. The "source:" may correspond to a restrict identifier in the news context that indicates that the search should be restricted to the news source that follows it. Similar restrict identifiers may be used in other contexts.

Query processing unit 320 may then perform a search based on the rewritten query and present results to the user. Query processing unit 320 may also offer a query link associated with the original query to the user. The query link, if selected by the user, may cause query processing unit 320 to perform a search based on the original query (i.e., without restricting the search to a particular entity).

If query processing unit 320 determines that the query term is associated with a common word or phrase, then query processing unit 320 may use the original query to perform a search (i.e., without restricting the search to a particular entity). Query processing unit 320 may also generate a query link associated with a rewritten query. Query processing unit 320 may rewrite the query, as described above, and provide a link to this rewritten query to the user. The query link, if selected by the user, may cause query processing unit 320 to perform a search based on the rewritten query.

Exemplary Processing

Figure 5:
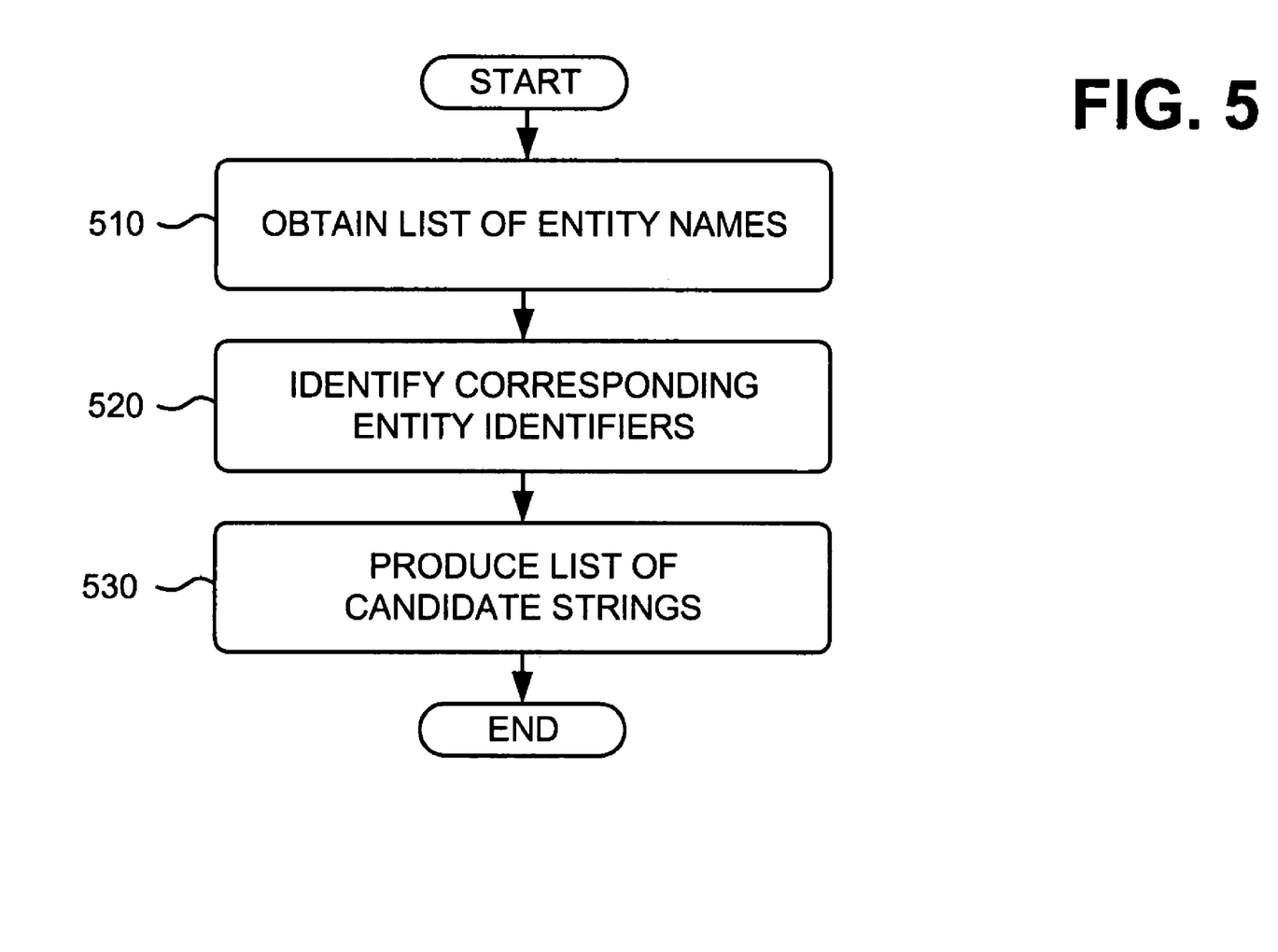
FIG. 5 is a flowchart of exemplary processing for generating a list of candidate strings according to an implementation consistent with the principles of the invention.

FIG. 5 is a flowchart of exemplary processing for generating a list of candidate strings according to an implementation consistent with the principles of the invention. Processing may begin with obtaining a list of entity names for a particular context (act 510). For each of the entity names, a corresponding entity identifier may also be identified (act 520). Several techniques exist for identifying entity names and/or entity identifiers for the list. For example, entity names and/or entity identifiers may be identified from online directories, lists, group postings, by analyzing a corpus of documents, etc.

A list of candidate strings may then be produced by transforming the entity names and/or entity identifiers (act 530). For example, the list of candidate strings for a particular entity name and its associated entity identifier may include the entity name as is, the entity identifier as is, the entity name without modifiers (e.g., "a," "the," "inc," "inc.," "co," and "co."), the entity name with spaces replaced with hyphens or underscores, and vice versa, the entity name without apostrophes, the entity name and/or entity identifier with "and" replaced with "&," and vice versa, the entity name and/or entity identifier without "and" and "&," the entity identifier without an initial "www." and/or a trailing ".com," and the entity identifier with a period with no spaces on either side of it replaced with spaces or deleted. Other or different transformations may also be used. One such list of candidate strings is illustrated in FIG. 4.

Figure 6:
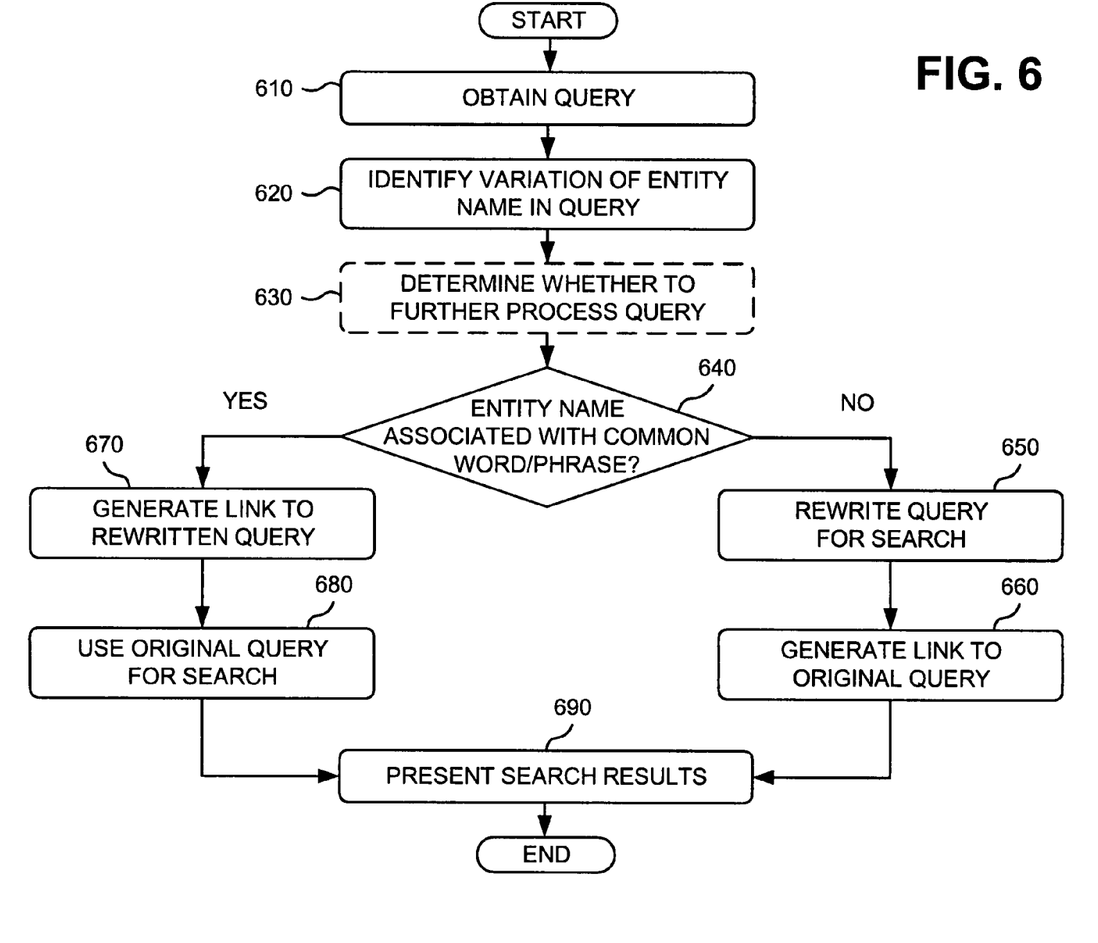
FIG. 6 is a flowchart of exemplary processing for selectively rewriting a query according to an implementation consistent with the principles of the invention.

FIG. 6 is a flowchart of exemplary processing for selectively rewriting a search query according to an implementation consistent with the principles of the invention. Processing may begin with receiving a search query from a user (act 610). The search query may contain one or more terms, which may or may not include the name of an entity.

The search query may be evaluated to identify possible entity names based on the list of candidate strings (act 620). For example, a term of the search query may be compared to the entity names, which include the variations of the entity names, in the list of candidate strings. In one implementation, the terms at the left-most position and/or right-most position within the search query may be evaluated to determine whether they correspond to one of the entity names in the list of candidate strings. In another implementation, each term of the query may be evaluated.

If a term in the search query matches one of the entity names, it may then optionally be determined whether the search query should be further processed (act 630). For example, it may be determined whether a word in the search query that neighbors the entity name forms a common phrase with the entity name, such that the combination of this word with the entity name forms a phrase that should not be decomposed. Common phrases may be identified from an exhaustive list of phrases, as described above.

When it is determined that no further processing of the query should occur, such as when a word in the search query forms a common phrase with the entity name, a search using the original query may be performed and the search results presented to the user. Optionally, a link to a rewritten query may be presented with the search results. The rewritten query may restrict the search to the entity identifier (e.g., domain) associated with the entity name in the query.

When it is determined that further processing of the query should occur, then it may be determined whether the entity name is associated with a common word or phrase (act 640). For example, the entity name may be compared to a dictionary of English words and phrases to determine whether it is associated with a common word or phrase. Alternatively, an IDF weighting technique or a conventional linguistic may be used, as described above.

In one implementation, portions of act 640 may be performed beforehand to generate a table of entity names that are common words or phrases. In this case, the determination of whether the entity name is associated with a common word or phrase may be performed by a simple table lookup operation.

If it is determined that the entity name is not associated with a common word or phrase, then the query may be rewritten to restrict the query to a search associated with the entity name (act 650). For example, the query may be rewritten to include a restrict identifier associated with a particular context. The restrict identifier may thereby restrict a search associated with the query to a search associated with the entity name. A search may then be performed based on the rewritten query.

A query link may also be generated that links to the original query (i.e., without restricting the search to a particular entity name) (act 660). The query link may be beneficial in those instances where the user did not intend a search based on the rewritten query.

If it is determined that the entity name is associated with a common word or phrase, then a query link to a rewritten query may be generated (act 670). For example, the query may be rewritten, as described above. Selection of the query link by the user may cause a search to be performed based on the rewritten query. A search may then be performed using the original query (i.e., without restricting the search to a particular entity name) (act 680).

The search, which may be performed based on the rewritten query, if applicable, or the original query, if applicable, may identify documents that are relevant to the rewritten/original query. For example, a repository of documents may be searched to identify documents that include one or more terms of the query. The resulting documents may form search results that may be presented to the user (act 690). In one implementation, the search results might take the form of links to the documents.

Automatic Query Rewrite Example—News Context

Figure 7:
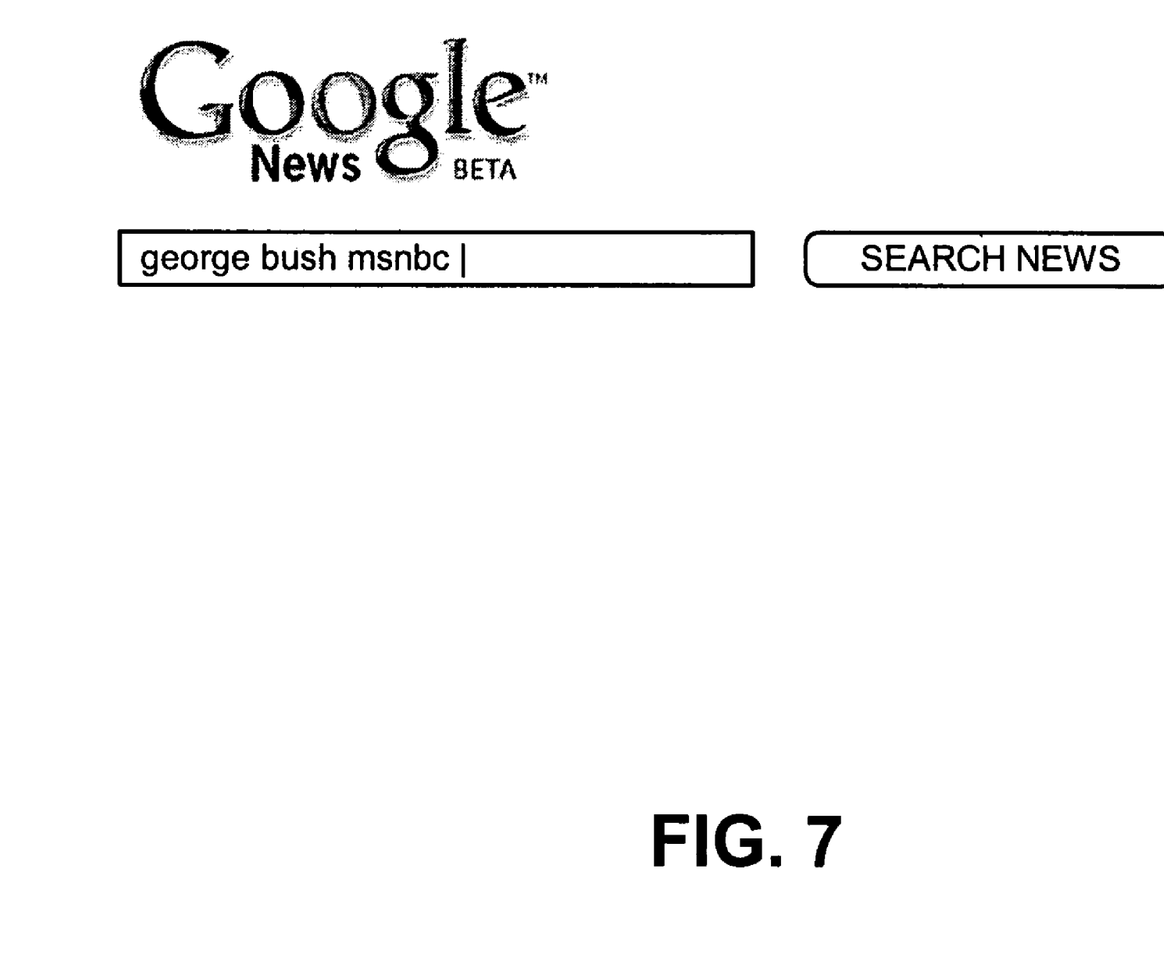
FIGS. 7 and 8 are diagrams of an automatic query rewrite example in a news context according to an implementation consistent with the principles of the invention.
Figure 8:
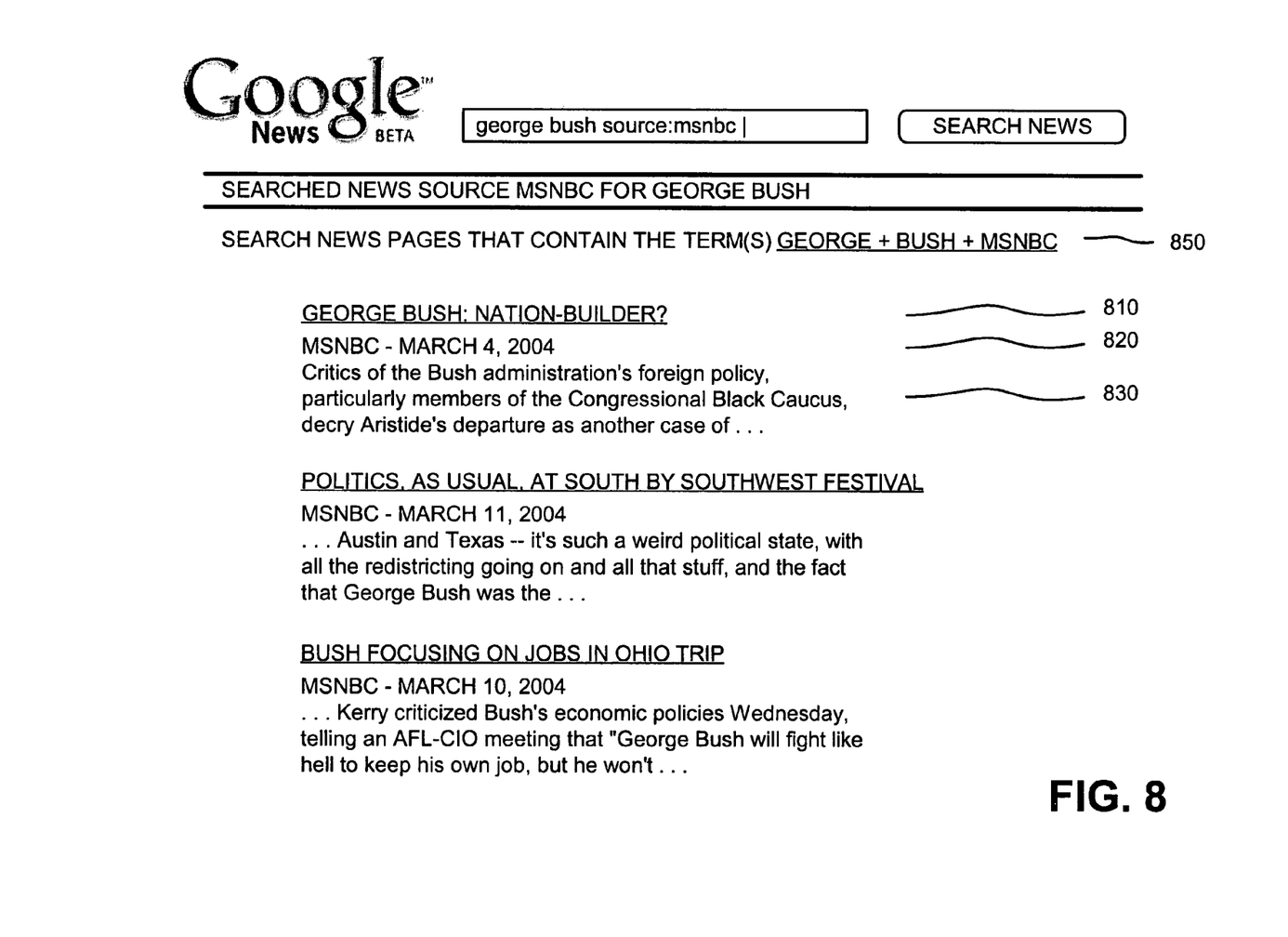

FIGS. 7 and 8 are diagrams of an automatic query rewrite example in the news context according to an implementation consistent with the principles of the invention. As shown in FIG. 7, a user may enter a search query via a graphical user interface associated with a search engine, such as search engine 125 (FIG. 1). In this example, the user enters the search query "george bush msnbc." Assume that the term "msnbc" identifies the news source msnbc.com and, thus, is included in the list of candidate strings (e.g., see FIG. 4).

Search engine 125 may identify "msnbc" as an entity name. Assume that search engine 125 determines that the phrase "bush msnbc" and/or the phrase "george bush msnbc" are not common phrases. Search engine 125 may then evaluate the entity name "msnbc" to determine whether it is associated with a common word or phrase. In this case, search engine 125 determines that "msnbc" is not associated with a common word or phrase. Search engine 125 may then rewrite the query to "george bush source:msnbc," as shown in FIG. 8.

Search engine 125 performs a search of a repository for documents (e.g., news documents) associated with the source msnbc.com that are relevant to the rewritten query. There are many ways to determine document relevancy. For example, documents that contain one or more of the search terms of the rewritten query may be identified as relevant. Documents that include a greater number of the search terms may be identified as more relevant than documents that include a fewer number of the search terms.

Search engine 125 may then present the relevant documents to the user as search results. As shown in FIG. 8, each search result may include a link 810 to a corresponding document, a news source identifier along with an indicator of when the document was created 820, and a brief description 830 of the corresponding document. Search engine 125 may also provide a query link 850 to the original query entered by the user. In this case, query link 850 may correspond to a query associated with a search for the search term "george," the search term "bush," and/or the search term "msnbc."

Suggest Query Rewrite Example—News Context

Figure 9:
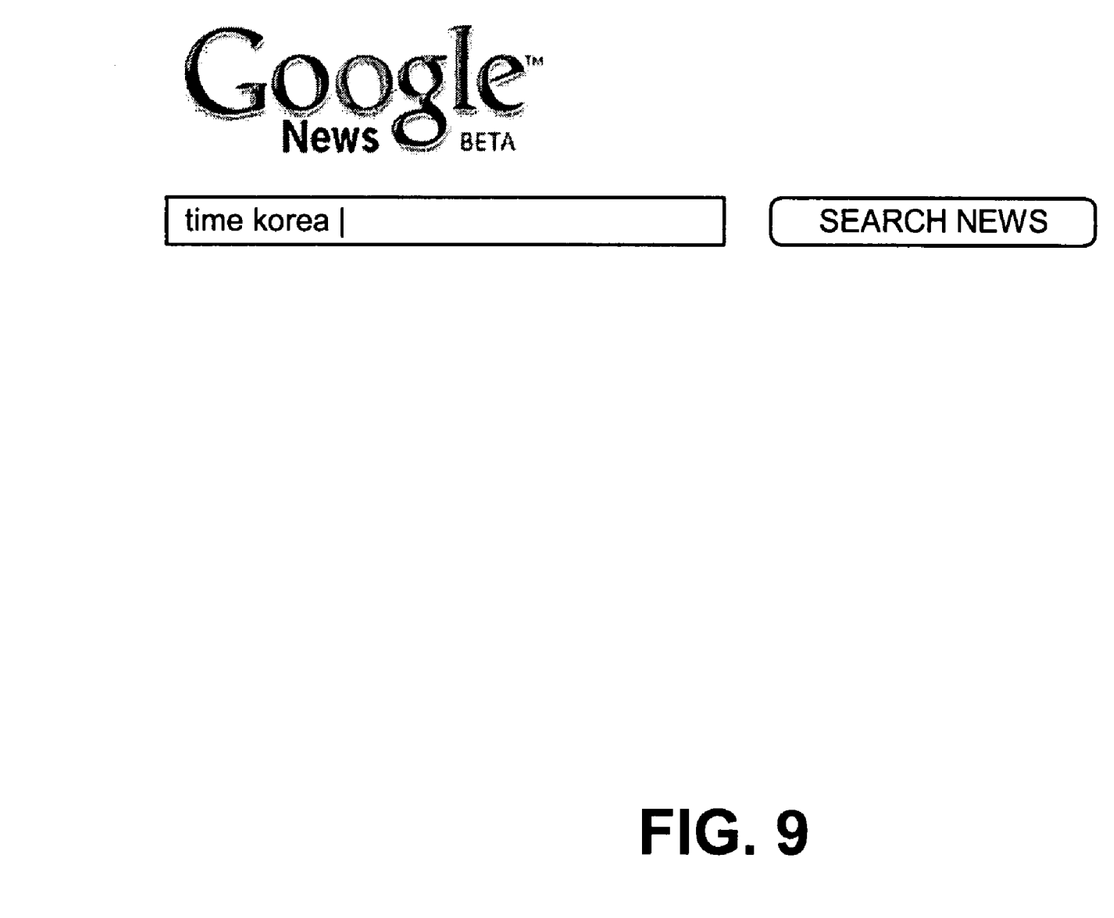
FIGS. 9-11 are diagrams of a query rewrite suggestion example in the news context according to an implementation consistent with the principles of the invention.
Figure 10:
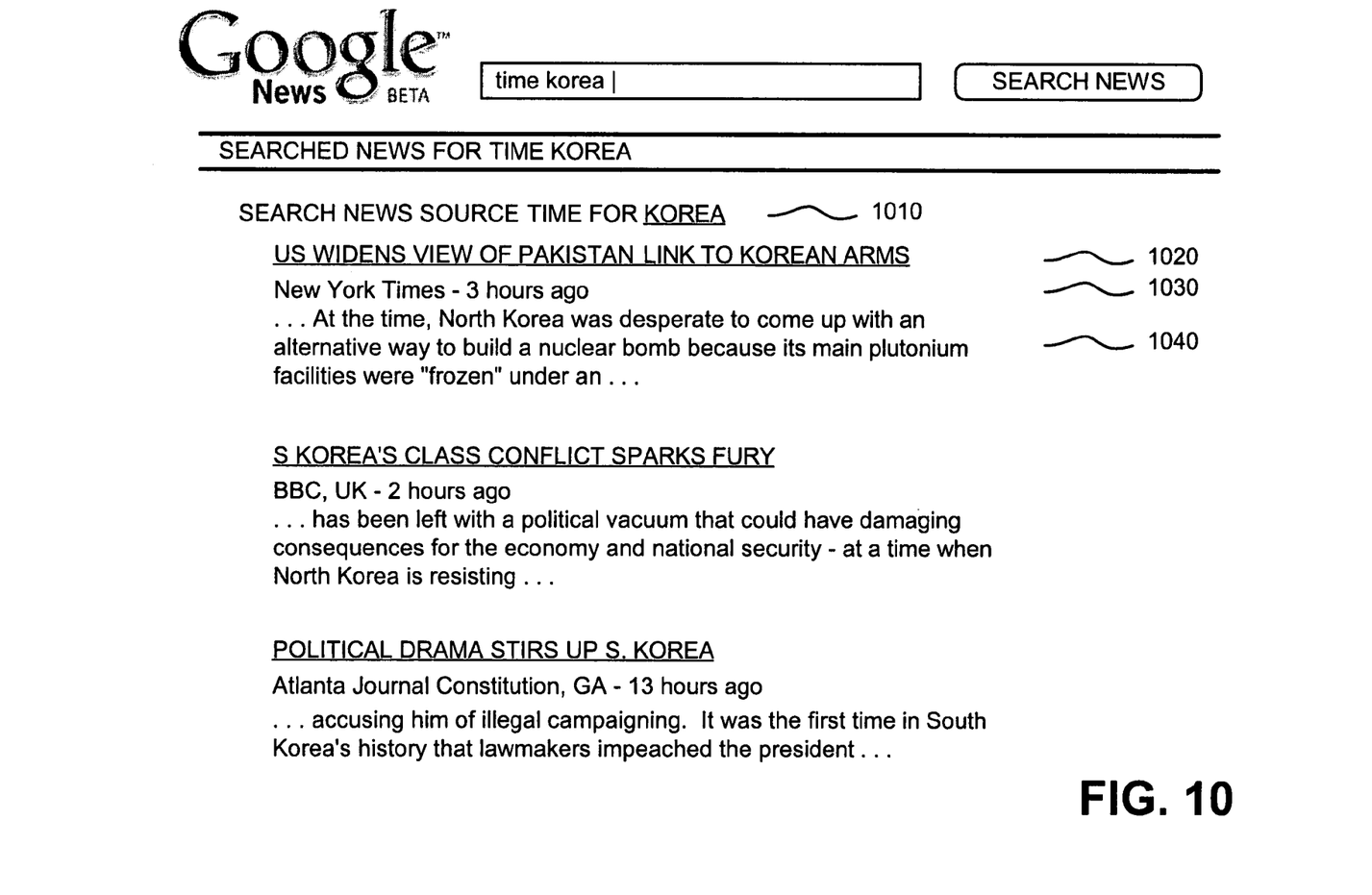
Figure 11:
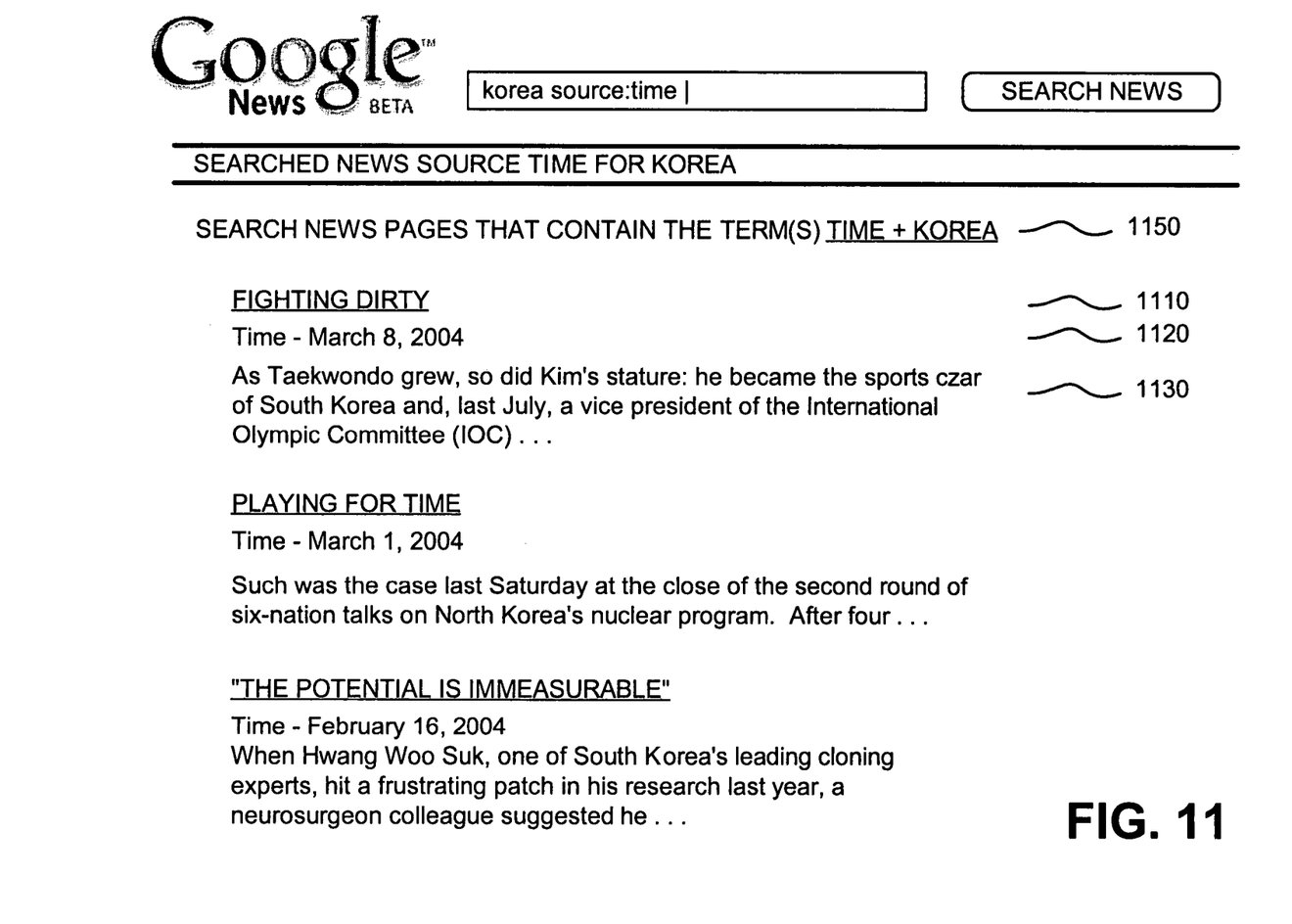

FIGS. 9-11 are diagrams of a query rewrite suggestion example in the news context according to an implementation consistent with the principles of the invention. As shown in FIG. 9, a user may enter a search query via a graphical user interface associated with a search engine, such as search engine 125 (FIG. 1). In this example, the user enters the search query "time korea." Assume that the term "time" identifies the news source time.com and, thus, is included in the list of candidate strings (e.g., see FIG. 4).

Search engine 125 may identify "time" as an entity name. Assume that search engine 125 determines that the phrase "time korea" is not a common phrase. Search engine 125 may then evaluate the entity name "time" to determine whether it is associated with a common word or phrase. In this case, search engine 125 determines that "time" is associated with a common word or phrase. Search engine 125 may then rewrite the query to "korea source:time" and generate a link 1010 ("Search News Source Time for Korea") to the rewritten query, as shown in FIG. 10.

Search engine 125 performs a search of a repository for documents (e.g., news documents) that are relevant to the original search query. As described above, there are many ways to determine document relevancy. For example, documents that contain one or more of the search terms of the rewritten query may be identified as relevant. Documents that include a greater number of the search terms may be identified as more relevant than documents that include a fewer number of the search terms. In this case, search engine 125 searches for documents that include the search terms "time" and/or "korea."

Search engine 125 may then present the relevant documents to the user as search results. As shown in FIG. 10, each search result may include a link 1020 to a corresponding document, a news source identifier along with an indicator of when the document was created 1030, and a brief description 1040 of the corresponding document. Because the search was not limited to the news source Time, the search results are associated with a number of different news sources (e.g., the New York Times, British Broadcasting Corporation (BBC), and Atlanta Journal Constitution).

If the user selects link 1010 associated with the rewritten query, search engine 125 performs a search of the repository for documents (e.g., news documents) associated with the news source time.com that are relevant to the rewritten query. Search engine 125 may then present the relevant documents to the user as search results. As shown in FIG. 11, each search result may include a link 1110 to a corresponding document, a news source identifier along with a date indicator 1120 corresponding to the date on which the document was created, and a brief description 1130 of the corresponding document. Optionally, search engine 125 may also provide a link 1150 to the original query entered by the user. In this case, link 1150 may correspond to a query associated with a search for the search term "time" and/or the search term "korea."

CONCLUSION

Systems and methods consistent with the principles of the invention may selectively rewrite search queries upon detection of the names of certain entities.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, it has been described that query processing unit 320 may perform a search based on the original or rewritten search query. In other implementations, query processing unit 320 may not perform the search, but may provide the original or rewritten search query to a search engine, such as search engine 125 (FIG. 1) to perform the search and provide the search results.

Also, while series of acts have been described with regard to FIGS. 5 and 6, the order of the acts may be modified in other implementations consistent with the principles of the invention. Further, non-dependent acts may be performed in parallel.

In one implementation, server 120 may perform most, if not all, of the acts described with regard to the processing of FIGS. 5 and/or 6. In another implementation consistent with the principles of the invention, one or more, or all, of the acts may be performed by another component, such as another server 130 and/or 140 or client 110.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method, comprising:
 receiving a search query from a device associated with a user;
 determining whether the received search query includes an entity name;
 determining whether the entity name corresponds to one of a plurality of common words or phrases;
 rewriting the received search query to include a restrict identifier that restricts a search based on the rewritten search query to a domain associated with the entity name;
 performing a search, based on the rewritten search query, to obtain search results when the entity name is determined not to correspond to one of the common words or phrases;
 presenting the search results to the device when the search is performed based on the rewritten search query;
 performing a search based on the received search query when the entity name is determined to correspond to one of the common words or phrases;
 providing, to the device, a link to the rewritten search query when the search is performed based on the received search query;
 receiving a selection of the link to the rewritten search query; and
 performing a search based on the rewritten search query in response to the selection of the link to the rewritten search query.

2. The method of claim 1, further comprising:
 providing a link to the received search query when the search is performed based on the rewritten search query.

3. The method of claim 2, further comprising:
 receiving selection of the link to the received search query; and
 performing a search based on the received search query in response to the selection of the link to the received search query.

4. The method of claim 1, further comprising:
 determining whether a word near the entity name in the received search query forms a common phrase with the entity name; and
 performing a search based on the received search query when it is determined that a word near the entity name forms a common phrase with the entity name.

5. The method of claim 1, wherein determining whether the entity name corresponds to one of the common words or phrases comprises:
 comparing the entity name to a dictionary of words or phrases.

6. The method of claim 1, wherein determining whether the entity name corresponds to one of the common words or phrases comprises:
 using an inverse document frequency weighting technique or a linguistic modeling technique to identify whether the entity name corresponds to one of the common words or phrases.

7. The method of claim 1, wherein determining whether the entity name corresponds to one of the common words or phrases comprises:
 generating a table of entity names that correspond to the common words or phrases, and
 determining whether the entity name corresponds to one of the common words or phrases based on the table.

8. The method of claim 1, wherein determining whether the received search query includes an entity name comprises:
 identifying a plurality of variations of a plurality of entity names, and
 determining whether the received search query includes one of the variations of the entity names.

9. A device, comprising:
 means for receiving a search query;
 means for determining whether the received search query includes an entity name;
 means for determining whether the entity name corresponds to one of a plurality of common words or phrases;
 means for rewriting the received search query to include a restrict identifier that identifies a particular domain associated with the entity name;
 means for performing a search within the particular domain, based on the rewritten search query, to obtain search results when it is determined that the entity name does not correspond to one of the common words or phrases;
 means for providing the search results when the search within the particular domain is performed;
 means for performing a search based on the received search query when the entity name is determined to correspond to one of the common words or phrases;
 means for providing a link to the rewritten search query when the search is performed based on the received search query;
 means for receiving a selection of the link to the rewritten search query; and
 means for performing a search based on the rewritten search query in response to the selection of the link to the rewritten search query.

10. The device of claim 9, further comprising:
 means for providing a link to the received search query when the search within the particular domain is performed.

11. The device of claim 10, further comprising:
 means for receiving selection of the link to the received search query; and
 means for performing a search based on the received search query in response to the selection of the link to the received search query.

12. A computer-implemented method, comprising:
 receiving a search query from a device associated with a user;
 determining whether the received search query includes an entity name;
 determining whether the entity name corresponds to one of a plurality of common words or phrases;
 when the entity name corresponds to one of the common words or phrases,
  generating a link to a rewritten query,
  performing a search based on the received search query to obtain first search results,
  providing, to the device, the first search results and the link to the rewritten query;
  receiving a selection of the link to the rewritten search query, and
  perform a search based on the rewritten search query in response to the selection of the link to the rewritten search query;
 and when the entity name does not correspond to one of the common words or phrases, rewriting the received search query to include a restrict identifier that identifies a particular domain associated with the entity name, generating a link to the received search query, performing a search for documents within the particular domain based on the rewritten search query to obtain second search results, providing, to the device, the second search results and the link to the received search query, receiving a selection of the link to the rewritten search query, and performing a search based on the rewritten search query in response to the selection of the link to the rewritten search query.

13. A system, comprising:

a memory to store instructions; and a processor to execute the instructions in the memory to:

receive a search query, determine that the received search query includes an entity name, determine whether the entity name corresponds to one of a plurality of common words or phrases, rewrite the received search query to include a restrict identifier that restricts a search, based on the rewritten search query, to a domain associated with the entity name, when the entity name is determined to correspond to one of the common words or phrases:

perform a search based on the received search query, provide a link to the rewritten search query, receive a selection of the link to the rewritten search query, and perform a search based on the rewritten search query in response to the selection of the link to the rewritten search query, and when the entity name is determined not to correspond to one of the common words or phrases:

perform a search based on the rewritten search query to obtain search results, and present the search results when the search is performed based on the rewritten search query.

14. The system of claim 13, where the processor is further configured to:

determine whether a word near the entity name in the received search query forms a common phrase with the entity name, and perform a search based on the received search query when it is determined that a word near the entity name forms a common phrase with the entity name.

15. The system of claim 13, where when determining that the received search query includes an entity name, the processor is configured to:

identify a plurality of variations of a plurality of entity names, and determine that the received search query includes one of the variations of the entity names.

16. A computer-readable memory device that stores computer-executable instructions, the computer-readable memory device comprising:

one or more instructions to receive a search query;

one or more instructions to determine that the received search query includes an entity name;

one or more instructions to determine whether the entity name corresponds to one of a plurality of common words or phrases;

one or more instructions to rewrite the received search query to include a restrict identifier that restricts a search based on the rewritten search query to a domain associated with the entity name;

one or more instructions to perform a search, based on the rewritten search query, to obtain search results when the entity name is determined not to correspond to one of the common words or phrases;

one or more instructions to present the search results when the search is performed based on the rewritten search query;

one or more instructions to perform a search based on the received search query when the entity name is determined to correspond to one of the common words or phrases;

one or more instructions to provide a link to the rewritten search query when the search is performed based on the received search query;

one or more instructions to receive a selection of the link to the rewritten search query; and one or more instructions to perform a search based on the rewritten search query in response to the selection of the link to the rewritten search query.

17. The computer-readable memory device of claim 16, further comprising:

one or more instructions to provide a link to the received search query when the search is performed based on the rewritten search query.

18. The computer-readable memory device of claim 17, further comprising:

one or more instructions to receive selection of the link to the received search query; and one or more instructions to perform a search based on the received search query in response to the selection of the link to the received search query.

* * * * *